US010410491B2

(12) United States Patent
Potter et al.

(10) Patent No.: US 10,410,491 B2
(45) Date of Patent: Sep. 10, 2019

(54) METHOD TO GENERATE A SOUND ILLUSION PROFILE TO REPLICATE A QUANTITY OF RESOURCES

(71) Applicant: MOTOROLA SOLUTIONS, INC., Chicago, IL (US)

(72) Inventors: Scott G. Potter, Coconut Creek, FL (US); Arthur E. Petela, Sunrise, FL (US); Steven Gilmore, Plantation, FL (US); Anthony M. Kakiel, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/848,185

(22) Filed: Dec. 20, 2017

(65) Prior Publication Data

US 2019/0188985 A1   Jun. 20, 2019

(51) Int. Cl.
| | | |
|---|---|---|
| G08B 15/00 | (2006.01) |
| H04R 3/12 | (2006.01) |
| G10L 25/63 | (2013.01) |
| G06Q 50/26 | (2012.01) |
| G01S 19/17 | (2010.01) |
| G08B 27/00 | (2006.01) |

(52) U.S. Cl.
CPC ............ *G08B 15/00* (2013.01); *G06Q 50/26* (2013.01); *G10L 25/63* (2013.01); *H04R 3/12* (2013.01); *G01S 19/17* (2013.01); *G08B 27/00* (2013.01); *G08B 27/001* (2013.01)

(58) Field of Classification Search
CPC ...... G08B 15/00; G08B 27/00; G08B 27/001; G06Q 50/26; G10L 25/63; H04R 3/12; G01S 19/17
See application file for complete search history.

(56) References Cited

U.S. PATENT DOCUMENTS

| | | |
|---|---|---|
| 6,577,738 B2 | 6/2003 | Norris et al. |
| 8,055,245 B2 | 11/2011 | Kurosawa |
| 8,630,820 B2 | 1/2014 | Amis |
| 9,652,975 B1 * | 5/2017 | Riley ................. A01K 15/021 |

* cited by examiner

*Primary Examiner* — Andrew L Sniezek

(57) ABSTRACT

A method is provided that generates a sound illusion profile to replicate a quantity of resources arriving at an incident scene. A virtual partner or the like determines that an incident has escalated from a first severity level to a second severity level. The virtual partner determines a quantity of resources needed to deescalate the incident to the first severity level. A sound illusion profile is generated to replicate a sound associated with the quantity of resources. A signal is sent to one or more speaker devices in a region surrounding the location of the incident to generate an output sound based on the sound illusion profile.

16 Claims, 2 Drawing Sheets

METHOD TO GENERATE A SOUND ILLUSION PROFILE TO REPLICATE A QUANTITY OF RESOURCES

BACKGROUND OF THE INVENTION

Situations often occur where a police officer arrives on a scene alone and enters a building to address a situation. If the suspect inside the building believes the officer is alone, the suspect may show a higher level of resistance than he would if he believed there were many other police at, or approaching, the scene. This can put the lone officer at a higher risk for attack and injury.

Unfortunately, it often takes many minutes for additional officers to arrive at the incident scene. While waiting for backup, the police officer is in a potentially perilous situation. The suspect can escalate tensions very quickly, especially if he thinks that the officer is alone and therefore vulnerable.

Therefore a need exists for a way to keep a police officer safe prior to backup arriving.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
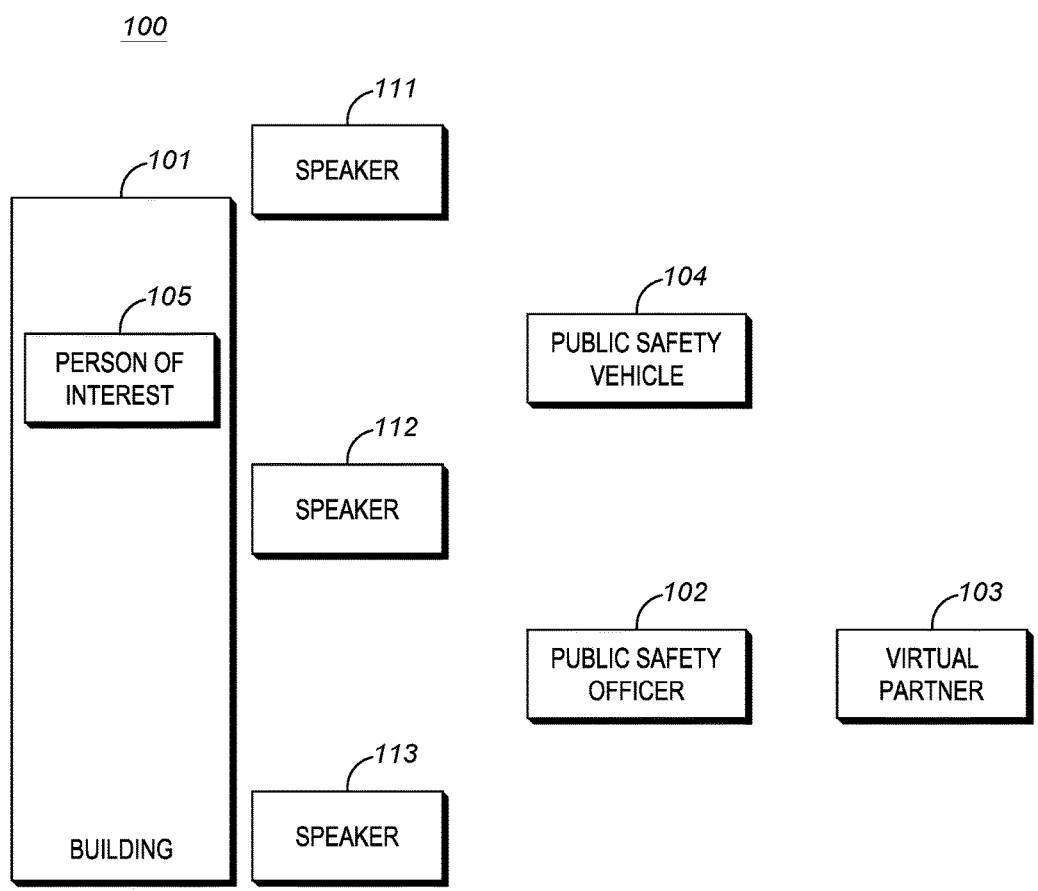
FIG. 1 depicts an incident scene in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment of the present invention solves many of the problems associated with the prior art. For example, a single public safety officer can be sent to an incident scene and the single officer can create an illusion that more public safety officers are currently at or arriving shortly to the incident scene.

Further, a virtual partner device assesses an officer risk level and automatically invokes the illusion of additional arriving officers. In addition, the arriving officer sound illusion is preferably dynamically customized based on context aware information in order to make the sound illusion more realistic and believable. An exemplary embodiment can be better understood with reference to the detailed description of FIGS. 1 and 2 below.

FIG. 1 depicts an incident scene 100 in accordance with an exemplary embodiment of the present invention. Incident scene 100 preferably comprises building 101, public safety officer 102, virtual partner 103, public safety vehicle 104, person of interest 105, and speakers 111-113.

Building 101 is a structure such as a home or apartment building. In an exemplary embodiment, building 101 is a residence, but could alternately be any type of structure, such as a garage, a shed, or a warehouse.

Public safety officer 102 is a person tasked with protecting public safety. In accordance with an exemplary embodiment, public safety officer 102 is a police officer, but public safety officer 102 can be a paramedic, an EMT, a firefighter, or any other person who could use safety and support while conducting public services in a dangerous situation. An exemplary embodiment also could provide additional support and protection for private citizens as well, such as security guards or other personnel.

Virtual partner 103 is a virtual personal assistant that assists public safety officer 102. Virtual partner 103 works with public safety officer 102 and communication devices used by public safety officer 102. Virtual partner 103 can also use services such as GPS, access county records, and assess the environment in and about incident scene 100. This helps virtual partner 103 customize the sound profile and make the sound profile sound as accurate and realistic as possible. Virtual partner 103 also preferably accesses servers and websites to determine, for example, weather such as precipitation and temperature to help in customizing the sound profile.

In accordance with an exemplary embodiment, virtual partner 103 is constantly assessing the officer situation and risk level by monitoring cameras and ambient sounds. The virtual partner preferably has the ability to automatically invoke the approaching officer sound illusion if it is determined that it may deescalate a situation.

Public safety vehicle 104 is a police car or other vehicle used by public safety officers. Public safety vehicle 104 is preferably enabled with sirens and speakers capable of playing different sound profiles. These sound profiles can include, but are not limited to, a standard car siren, the sound of one or more approaching car sirens, the sound of cars screeching to a stop on pavement or a dirt road, the sound of car door opening and closing, the sound of police talking and shouting commands, and the sound of footsteps on various surfaces.

Person of interest 105 is a person that public safety officer 102 is interacting with. Person of interest 105 may be a suspect in a criminal investigation, a person that public safety officer 102 has encountered, a witness to a suspected crime, or a friend or relative of a criminal suspect.

Speakers 111-113 provide audio amplification of signals received. In an exemplary embodiment, the signals are received from virtual partner 103. Speakers 111-113 can be located in vehicles, be portable device speakers, or can be wireless speakers. Speakers 111-113 can be synched with each other to make a seamless sound illusion while utilizing each speaker's spatial location with respect to other speakers.

Figure 2:
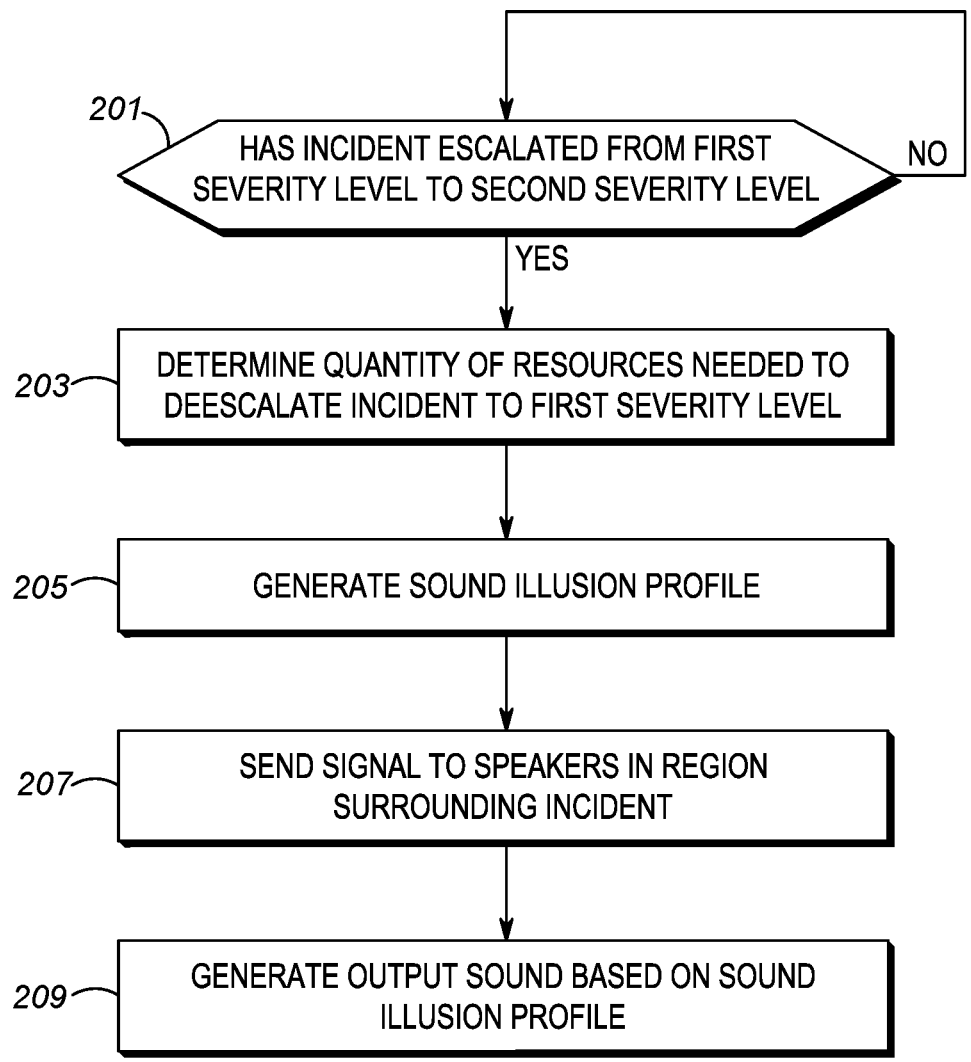
FIG. 2 depicts a flow chart in accordance with an exemplary embodiment of the present invention.

FIG. 2 depicts a flow chart 200 in accordance with an exemplary embodiment of the present invention. In accordance with this exemplary embodiment, a single public safety officer 102 has exited his car 104 without turning on the siren, for example when responding to a domestic disturbance call inside an apartment building 101. As public safety officer 102 enters building 101, his virtual partner device 103 is collecting information on the environment, including facts such as that the stairs are carpeted and the hallways have wood floors. In one exemplary embodiment, public safety officer 102 decides to place a wireless speaker unit, such as wireless speaker 111, at the top of the interior stairs, "just in case".

While at incident scene 100, at some point virtual partner 103 determines (201) whether an incident has escalated from a first severity level to a second severity level. If not, the process returns to step 201 to continue to monitor the situation.

If virtual partner 103 determines that an incident is escalating from a first severity level to a second severity level, the process continues. As an example of determining that the incident is escalating, public safety officer 102 may arrive at incident scene 100 and engage person of interest 105 with questions. Person of interest 105 is becoming belligerent and the situation is slowly escalating from a first severity level to a second severity level. Virtual partner 103 has been monitoring the situation and based on input to virtual partner 103 a decision is made by virtual partner 103 that this situation would benefit from a sound illusion of approaching additional public safety officers.

In a first exemplary embodiment, the determination that the incident has escalated occurs based upon sounds heard at the incident. The sounds can include, without limitation, a tone of voice, predetermined words spoken, the sound of a weapon being drawn. In a further exemplary embodiment, the determination of escalation can be determined by an assessment of the number of distinct voices. Still further, the determination of escalation can be determined by video collected by virtual partner 103 at incident scene 100. The video analysis can use, for example, suspicious facial expressions or video detection of weapons.

Virtual partner 103 determines (203) a quantity of resources needed to deescalate the incident to the first severity level. The quantity of resources can be, for example, the number of responders needed to deescalate the incident to the first severity level. Alternately, the quantity of resources can be the number of vehicles needed to deescalate the incident to the first severity level or the number of weapons or equipment needed to deescalate the incident to the first severity level.

Virtual partner 103 generates (205) a sound illusion profile to replicate a sound associated with the quantity of resources. The sound illusion profile can be generated using a variety of variables, such as the location of the incident or ambient noise parameters at the incident. The ambient parameters can include road conditions, such as whether the roads are paved or unpaved, or weather conditions.

The sound illusion profile can be a conversation, preferably a computer-generated conversation. In this scenario, the computer-generated conversation includes, for example, conversations of police officers and a dispatcher dispatching officers to the incident scene.

In accordance with an exemplary embodiment, the computer-generated conversation includes a predetermined key word. This key word indicates to public safety officer 102 that this conversation is not an actual conversation between real-life officers, but rather a computer-generated conversation. This helps public safety officer 102 know whether the additional personnel and resources are actually on the scene or whether this chatter is intended to make person of interest 105 that additional personnel and resources are arriving at incident scene 100. Public safety officer 102 can interact with this computer-generated conversation, and the response from virtual partner 103 will respond to this conversation from public safety officer 102.

In one exemplary embodiment, virtual partner 103 selects and plays the sound of approaching sirens and can include car tires screeching to a halt, making person of interest 105 think that public safety officer 102 is receiving backup resources, thereby incentivizing person of interest 105 to deescalate the tension from a second severity level to a first, lower severity level. The sound profile can then continue with the sound of the opening and closing of doors and public safety officers exchanging instructions with each other. Sound profiles can be overlaid on each other in any combination to create an illusion such as several cars on scene with more approaching and police surrounding the building.

In accordance with an exemplary embodiment, virtual partner 103 can extend the sound profiles to play on other officers' portable communication devices. In this way, an individual supporting officer in a hallway could create a sound illusion of many more officers in the hallway.

Sound illusions can be extended onto a separate wireless speaker device that public safety officer 102 may place as he approaches a potential situation. For example, public safety officer 102 may proactively place a wireless speaker device in the hallway of an apartment building before knocking on a door in response to a call.

The ambient parameters can also include building structural conditions, such as type of flooring, for example hardwood floors or carpeted floors.

Virtual partner 103 sends (207) a signal to one or more speaker devices in a region surrounding the location of the incident.

In accordance with an exemplary embodiment, speakers 111, 112, and 113 generate (209) an output sound based on the sound illusion profile. If multiple public safety vehicles actually are on the scene, the car sound profiles are preferably synced with each other to further the illusion. For example, if the first public safety vehicle and the second public safety vehicle are on opposite sides of a building, the first public safety vehicle may initially play the sound of an approaching vehicle at a louder volume than the second public safety vehicle. This creates the illusion of the approaching car parking in between first public safety vehicle and second public safety vehicle. The approaching speaker volumes are preferably slowly decreased until they become equal in both first public safety vehicle and second public safety vehicle.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method comprising:
   determining that an incident has escalated from a first severity level to a second severity level;
   determining a number of weapons needed to deescalate the incident to the first severity level;
   generating a sound illusion profile to replicate a sound associated with the number of weapons; and
   sending a signal to one or more speaker devices in a region surrounding the location of the incident to generate an output sound based on the sound illusion profile.
2. The method of claim 1, wherein the step of generating a sound illusion profile further comprises generating the sound illusion as a function of the location of the incident.
3. The method of claim 1, wherein the step of generating a sound illusion profile further comprises generating the sound illusion as a function of ambient parameters at the incident.
4. The method of claim 3, wherein the ambient parameters are road conditions.
5. The method of claim 3, wherein the ambient parameters are weather conditions.
6. The method of claim 3, wherein the ambient parameters are building structural conditions.
7. The method of claim 1, wherein the step of determining that an incident has escalated from a first severity level to a second severity level comprises determining that an incident has escalated from a first severity level to a second severity level based upon sounds heard at the incident.
8. The method of claim 7, wherein the sounds comprise a tone of voice.
9. The method of claim 7, wherein the sounds comprise predetermined words.
10. The method of claim 7, wherein the sounds comprise a detection of weapons being drawn.
11. The method of claim 1, wherein the step of determining that an incident has escalated from a first severity level to a second severity level comprises determining that an incident has escalated from a first severity level to a second severity level based upon an assessment of the number of distinct voices.
12. The method of claim 1, wherein the step of determining that an incident has escalated from a first severity level to a second severity level comprises determining that an incident has escalated from a first severity level to a second severity level based upon video collected at the incident.
13. The method of claim 12, wherein the video comprises suspicious facial expressions.
14. The method of claim 12, wherein the video comprises a detection of weapons.
15. A method comprising:
   determining that an incident has escalated from a first severity level to a second severity level;
   determining a quantity of resources needed to deescalate the incident to the first severity level;

generating a sound illusion profile to replicate a sound associated with the quantity of resources, wherein the sound illusion profile comprises computer-generated conversations; and sending a signal to one or more speaker devices in a region surrounding the location of the incident to generate an output sound based on the sound illusion profile.

16. The method of claim 15, the method further comprising the step of inserting a key word into the computer-generated conversation, the key word indicating that the computer-generated conversation is the sound illusion profile.

* * * * *